(12) United States Patent
Stümpert et al.

(10) Patent No.: US 6,952,433 B1
(45) Date of Patent: Oct. 4, 2005

(54) METHOD FOR INCREASING THE FLEXIBILITY OF A COMMUNICATION NETWORK WITH SEPARATED CALL CONTROL AND BEARER CONTROL

(75) Inventors: Martin Stümpert, Hochspeyer (DE); Timo Suihko, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1319 days.

(21) Appl. No.: 09/609,796

(22) Filed: Jul. 3, 2000

(30) Foreign Application Priority Data

Jul. 5, 1999 (EP) .......................................... 99112948

(51) Int. Cl.[7] .................................................. H04J 3/12
(52) U.S. Cl. ...................... 370/524; 370/522; 370/360; 370/386; 370/384; 370/426; 370/401
(58) Field of Search .............................. 370/401, 524, 370/395.3, 410, 331, 360, 386, 522, 384, 426; 379/350, 221.09, 242

(56) References Cited

U.S. PATENT DOCUMENTS

| | | | | |
|---|---|---|---|---|
| 5,461,669 A | * | 10/1995 | Vilain | 379/350 |
| 6,449,284 B1 | * | 9/2002 | Hagirahim | 370/466 |
| 6,529,490 B1 | * | 3/2003 | Oh et al. | 370/331 |
| 6,683,878 B2 | * | 1/2004 | Gardner et al. | 370/395.3 |

FOREIGN PATENT DOCUMENTS

| | | |
|---|---|---|
| WO | WO 97/42780 | 11/1997 |
| WO | WO 98/37714 | 8/1998 |

OTHER PUBLICATIONS

Gerling, J.C.J.; European Search Report, Application No. EP 99 11 2948, Feb. 14, 2000, pp. 1–3.

\* cited by examiner

*Primary Examiner*—Wellington Chin
*Assistant Examiner*—Chuong Ho

(57) ABSTRACT

A system and method that enables a more flexible architecture in communication networks with separated call control and bearer control. The invention enables full support of the advantages of a communication network with separated call control and bearer control when interfacing with a further network with monolithic signalling. The invention also increases the flexibility of an existing payload connection, especially in the case of a malfunction. The invention uses the existing signalling protocols to transfer further information. Basically, information elements and methods to interpret the transferred information are stored in the receivers and senders of the information. This enables the receivers and senders of information to transmit more information than originally planned when the protocols where designed. So it is possible to identify a combination of a payload transmission device and a control node instead of a single device only. It is further possible, to identify an assignment as a further assignment. This allows the change of a current assignment for a radio access controller.

9 Claims, 4 Drawing Sheets

METHOD FOR INCREASING THE FLEXIBILITY OF A COMMUNICATION NETWORK WITH SEPARATED CALL CONTROL AND BEARER CONTROL

BACKGROUND OF THE INVENTION

1. Technical Field of the Invention

The present invention relates to a method for rerouting of calls in communication networks, as for instance GSM (Global System for Mobile Communication) or UMTS (Universal Mobile Telecommunication System) networks with separated call control and bearer control. The invention further relates to a method to connect a further communication network with monolithic signalling, as for example an combination of C7 and ISUP (ISDN User Part) to a communication network with separated call control and bearer control.

2. Description of Related Art

Recently communication networks have been proposed that separate the call control and bearer control at least logically. For example the IETF draft SS7-Internet Engineering—Architectural Framework, published July 1998 introduces a concept for such a network architecture. However, the IETF draft includes only a rough concept of separating call control and bearer control.

The published concepts of connecting a further network with monolithic, that is not supporting a separation of call control and bearer control, signalling and a communication network with transport independent call control, that is a call control that is independent of the payload transmission, lead to the assumption that there is a one to one relation between interface means for the signalling and the interface means for the payload transmission. An one to one relation between these interface means forces signalling interface means of a communication network to interwork always with the same interface means for the payload connection, independent of call requirements. This means for example in a GSM network with separated call control and bearer control that is connected to a fixed network with ISDN signalling, that a signalling gateway must always link in the same media gateway for the payload transmission, independent from the incoming call being a voice or a data call. This leads to an inflexible architecture that does not take full advantage of the opportunities offered by the separation of call control and bearer control.

A further inflexibility is the lack of mechanisms that allow a change of the selected payload transmission devices without releasing a call.

Therefore, it is object of the invention to support a more flexible architecture based on the separation of call control and bearer control.

It is a further object of the invention to combine networks with monolithic signalling like a combination of ISUP and C7 to communication networks with transport independent call control.

It is also object of the invention to allow a higher flexibility in a network with separated call control and bearer control without changing existing signalling protocols.

Another object of the invention is to allow further assignments of already assigned radio access transmission devices.

It is advantageous that no change of existing protocols is necessary to implement the method. This reduces the costs and the time needed for the implementation. Especially advantageous is that the reassignment of an already assigned radio access network controller can be done without releasing the connection to a subscriber. This allows handling equipment failure without call interruption.

Very advantageous is according to claim 2 the use of the existing ISUP protocol, as this is a widespread protocol and therefore enables a large number of operators to easily make use of the invention.

Especially advantageous is according to claim 3 the use of different routes for the identification, by this an easy to handle differentiation is possible and the identification of the payload transmission device between a transit switch and a signalling interface is handled independent from the identification network internally.

Very advantageous is the identification of the devices by a destination or and originating point code according to claim 4. Firstly these codes are parameter that are already used in an initial address message, and secondly they are already used to identify devices. This reduces changes in the existing implementations when adapting it to the invention.

Further advantageous is the use of circuit identity codes according to claim 5 this also makes the identification handling in the network independent from the identification at the interface. Furthermore, an appointment of a circuit identity code has to be done anyway to set-up a connection. This saves some extra work during a network set up.

Very advantageous is the initiation of a reassignment by a different control node than the serving control node according to claim 7. This allows a detection of errors or an optimisation of a connection by different nodes.

SUMMARY

A method, communication network and software program are provided that enable a more flexible architecture in communication networks with separated call control and bearer control. The invention enables full support of the advantages of a communication network with separated call control and bearer control when interfacing with a further network with monolithic signalling. The invention also increases the flexibility of an existing payload connection, especially in the case of a malfunction. The invention uses the existing signalling protocols to transfer further information. Information elements and methods to interpret the transferred information are stored in the receivers and senders of the information. This enables the receivers and senders of information to transmit more information than originally planned when the protocols were designed. It is thereby possible to identify a combination of a payload transmission device and a control node instead of a single device only. It is further possible to identify an assignment as a further assignment. This allows the radio access controller to change a current assignment.

In the following the invention will be further described by means of examples and by means of the figures.

DETAILED DESCRIPTION OF THE DRAWINGS

Figure 1:
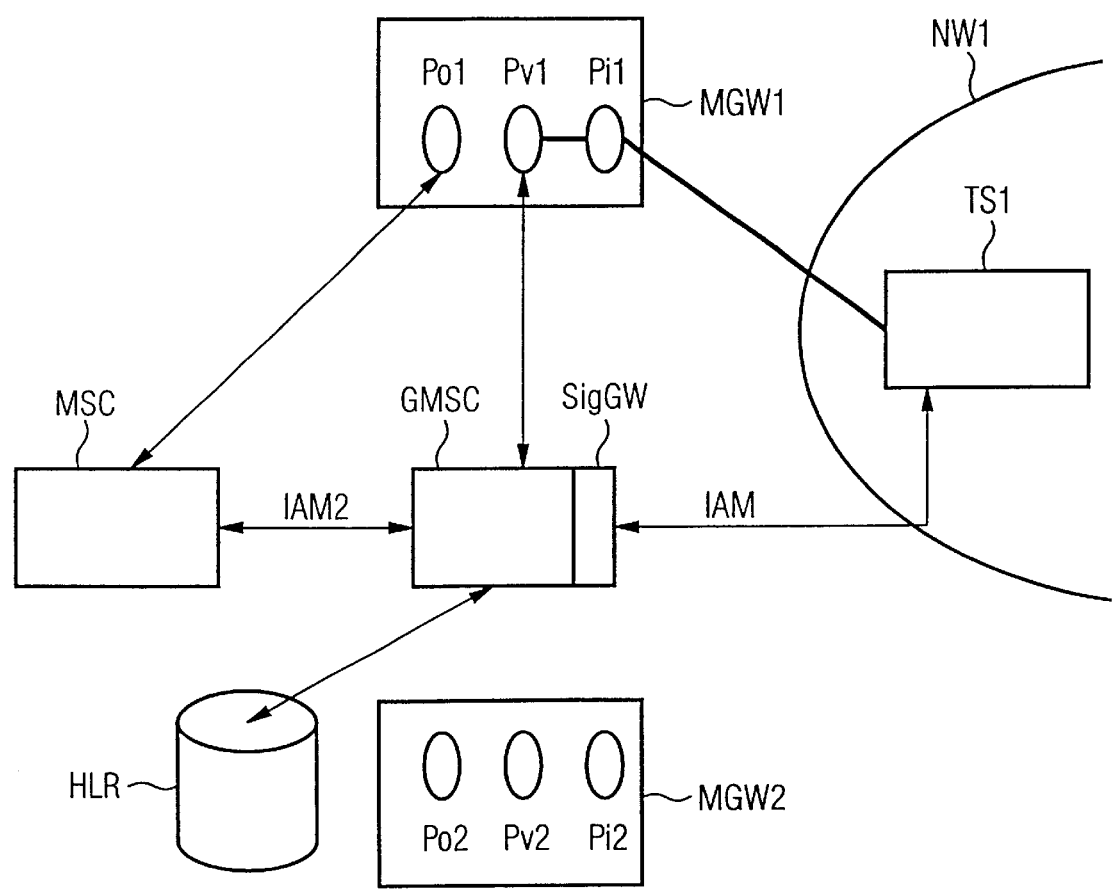
FIG. 1 depicts a call set-up originating in a further network with monolithic signalling terminated UMTS communication system.

As it is not necessary to change the current UMTS or GSM system underneath the radio network controller level to implement the new architecture, these parts will not be described. The release of resources is not described also, because it is not of importance for the description of the current invention.

The invention deals with the set-up of a connection between a communication system with separated call control and bearer control and a transit switch of a further network with monolithic transmission. It enables to combine communication systems with monolithic signalling to communication systems with TICC (transport independent call control). One problem when combining these systems is, that monolithic signalling systems do neither support the separation of call control and bearer control nor support the interworking of one signalling interface device with more than one payload transmission device.

It also describes how a call can be re-routed if a payload transmission device or a logical point of such a device has to be replaced without interruption of an active call.

Originally neither GSM nor UMTS communication networks do support a separation of call control and bearer control; they are selected as examples of networks that can be implemented with the new architecture. In the following some definitions are given.

Bearer control is the control of the selection of a path through the cellular network and utilising, that is reserving, giving free, releasing, and setting up, the required resources as ordered by call control.

Call control is the aspect of signalling related to subscriber and service control. A logical point is a reference within a payload transmission device and identifies together with an identification of the payload transmission a certain connection point.

Control nodes provide the application logic. In GSM for example control nodes are mobile services switching centres, gateway mobile services switching centres and base station controller in UMTS also radio network controller.

Applications can be for example GSM, D-AMPS (Digital American Mobile Phone System), PDC (Personal Digital Cellular) or UMTS.

A media gateway modifies and switches the user plane. It performs operations such as announcement generation, tone generation, echo cancellation, modem handling for data calls and codec handling for speech calls.

Radio access network controller connect a core network to an access network, examples for radio access network controller are base station subsystems and radio network controller.

A signalling gateway performs bearer conversion of signalling messages like conversions from STM (Synchronous Transfer Mode) based C7 to ATM (Asynchronous Transfer Mode) based C7 and vice versa.

A signalling interface device interfaces the call control of a communication network with transport independent call control with a monolithic signalling network. It is for example a control node connected through a signalling gateway.

Monolithic signalling is a signalling system that is not prepared for a separation of call control and bearer control, one example of monolithic signalling is the combination of ISUP and C7.

Transport independent call control is the opposite of monolithic signalling it supports the separation of call control and bearer control.

An intersystem connection from a network with monolithic signalling interfaces via a transit switch. Monolithic signalling does not support the separation of call control and bearer control, in particular it is not capable to support the interworking of one signalling gateway with more than on media gateway. To enable a gateway mobile services switching centre GMSC in an UMTS communication network with ISUP signalling and AAL2 payload transmission to interwork with several media gateways requires a method that makes the selection of a media gateway transparent for the selecting a transit switch. From the point of view of a transit switch, each combination of a media gateway and a control node appears as one different interface that handles call control and bearer control.

The invention introduces three ways to achieve this task. Two of them will by explained in the description of FIG. 1 the third will be explained under FIG. 2. Equal labels like MGW1 or Po2 describe equal means in FIG. 1 and FIG. 2 and in FIG. 3 and FIG. 4.

In the following the invention will be described by FIG. 1.

In a first step a transit switch TS I selects an interface that is capable of handling the call. Afterwards the transit switch TS I sends an ISDN (Integrated Services Digital Network) initial address message IAM to a gateway mobile services switching centre GMSC via a signalling gateway SigGW. An initial address message contains among other information a destination point code and a circuit identity code. A destination point code is an address of a gateway mobile services switching centre. A circuit identity code identifies a certain connection that has been selected.

The first method uses the destination point code as an identification of combinations of media gateway and gateway mobile services switching centre. This requires that the gateway mobile services switching centre GMSC owns several destination point codes, one for each media gateways it is working with. In a next step the gateway mobile services switching centre GMSC looks up in means for assigning which media gateway has been required by the transit switch TS1. In this example it is the media gateway MGW1. The gateway mobile services switching centre GMSC contacts the selected media gateway MGW1 and sends a resource request including the circuit identity code. The media gateway MGW1 grants the resources by sending a resource response. Afterwards the gateway mobile services switching centre GMSC orders the media gateway to through connect from the transit switch TS1 to a logical point Pv1 via an incoming logical point Pv1. The outgoing point Po1 is only shown for reasons of completeness. In a following step the gateway mobile services switching centre GMSC requires and gets routing information form a home location register HLR. The gateway mobile services switching centre GMSC selects a mobile services switching centre MSC. To address this mobile services switching centre MSC the gateway mobile services switching centre GMSC looks up a destination point code for the combination of this mobile services switching centre MSC and the media gateway MGW1. As the destination point code in the initial address message identifies the combination of the mobile services switching centre MSC and the media gateway MGW1 it has to be different from the destination point code sent in the first initial address message IAM. The mobile services switching centre MSC owns one point code for each media gateway it can interwork with.

In a next step the gateway mobile services switching centre GMSC hands over call control to this mobile services switching centre MSC by sending an initial address message IAM2 that includes the destination point code.

This method also works in the opposite direction. In the case that a call is routed from the communication network with separated call control and bearer control to the further network NW1, the identification of the media gateway is done by the originating point code instead of the destination point code. The originating point code identifies a combination of gateway mobile services switching centre GMSC and media gateway.

The second method uses the circuit identity code to determine the media gateway. A circuit identity code identifies a certain payload connection, in example a time slot in a PCM (Pulse code modulation) connection. This circuit identity codes can be mapped to different media gateways, for example circuit identity codes 1 to 10 to a first media gateway MGW1 and circuit identity codes 11 to 20 to a second media gateway. The signalling gateway maps the circuit identity codes to the assigned media gateways. The steps for this method are the same as those in the first method apart from that the look-ups are based on the circuit identity codes. This circuit identity codes necessarily correspond to the physical connections that are used for transmission. The initial address message IAM2 sent to the mobile services switching centre MSC can contain an originating point code, a destination point code and a circuit identity code or alternatively a media gateway address and a logical point code. Both information can be derived from each over. The logical point code identifies together with the media gateway address the logical point Pv1. From the logical point Pv1 the mobile services switching centre MSC has the call control for the payload connection.

Like the first method, this method can also be used in opposite direction. In the case that a call is routed from the communication network with separated call control and bearer control to the further network NW1 with monolithic signalling. In this direction also the circuit identity code will be used for the identification of a combination of gateway mobile services switching centre GMSC and media gateway. The circuit identity code used for the identification certainly has to be the identification of that physical circuit, here a PCM time slot, that is used for the payload transmission.

In the following the invention will be described by FIG. 2.

Figure 2:
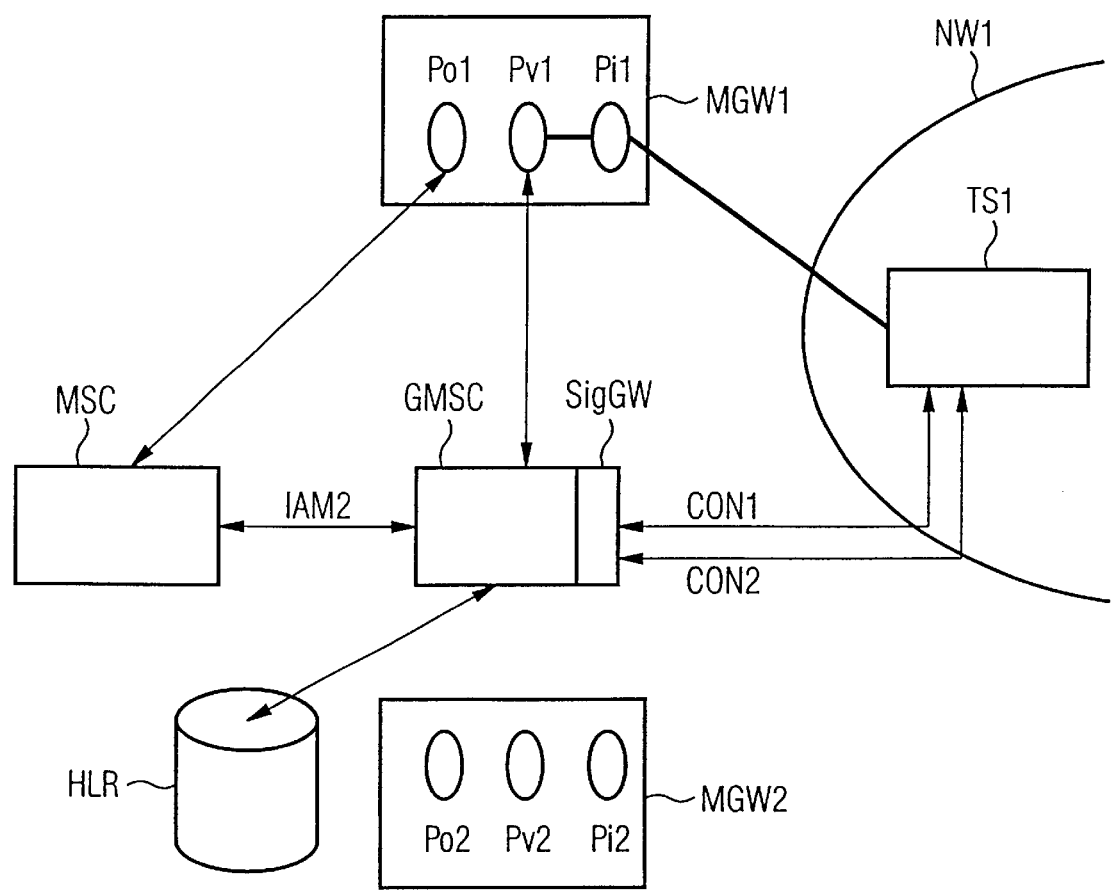
FIG. 2 depicts a second call set-up originating in a further network with monolithic signalling terminated UMTS communication system.

FIG. 2 depicts an interworking between a network NW1 with monolithic ISUP and an UMTS network with separated call control and bearer control. In a first step the transit switch TS1 selects an interface that is capable of handling the call. Afterwards the transit switch TS1 sends an initial address message IAM to the gateway mobile services switching centre GMSC via the signalling gateway SigGW. The transit switch TS1 of the further network uses a variety of signalling connections CON1 and CON2 to a signalling gateway SigGW1 and the gateway mobile services switching centre GMSC. Each of the signalling connections is assigned to one media gateway MGW1 and MGW2 in a one to one relation. The gateway mobile services switching centre GMSC derives from the signalling route, which media gateway has been selected by the transit switch TS1. To hand over the call control to the mobile services switching centre MSC the gateway mobile services switching centre GMSC sends an initial address message IAM2. Like in the second method the gateway mobile services switching centre GMSC include in the initial address message IAM2 either an originating point code, a destination point code and a circuit identity code or a media gateway address and a logical point code.

This method can also be used to identify a combination of gateway mobile services switching centre GMSC and media gateway in the case that the call is set up towards the further network NW1. The signalling route selected by the gateway mobile services switching centre GMSC identifies said combination uniquely for the transit switch TS1.

In the following the invention will be described by FIG. 3.

Figure 3:
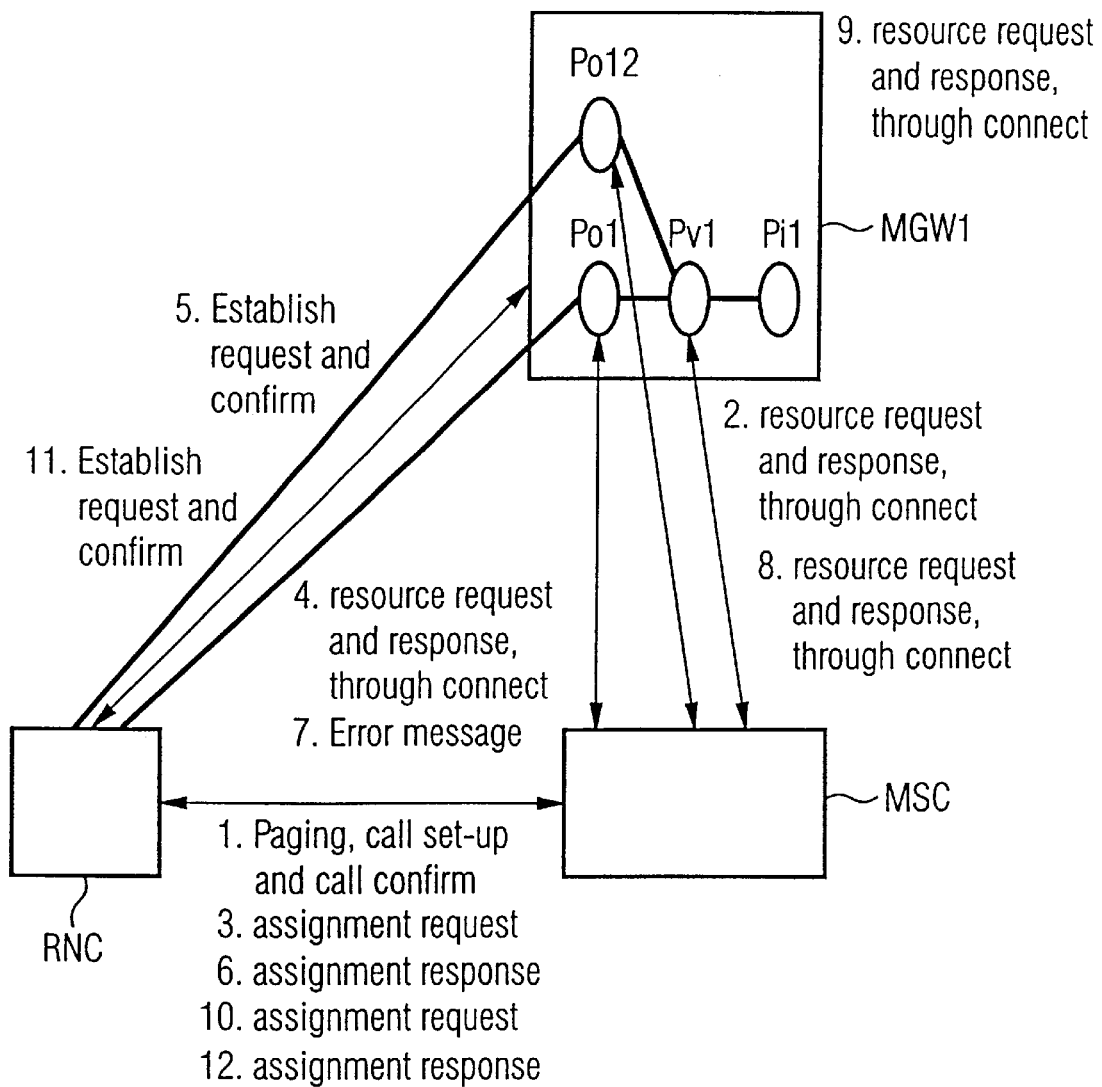
FIG. 3 depicts a reassignment of a radio network controller in a UMTS network with separated call control and bearer control.

FIG. 3 shows an extract of an UMTS communication network including a media gateway MGW1, a mobile services switching centre MSC and a radio network controller RNC. The radio network controller RNC is in this case a terminating radio network controller RNC. As the network and the signalling in the network on both sides of the shown extract are not important for the invention the are not explained. A payload connection is already through connected to an incoming logical point Pi1 of the media gateway MGW1. The mobile services switching centre MSC is in charge of the call control after it received for example an initial address message. In a first step 1 the mobile services switching centre MSC orders the radio network controller RNC to page the subscriber. It receives a page response and does the call set-up and call confirmation. In a second step 2 resources in the media gateway MGW1 are ordered, granted and through connected via an intermediate logical point Pv1 to an outgoing logical point Po1. In a next step 3 the mobile services switching centre MSC orders the radio network controller RNC to assign the call. The radio network controller RNC requests and gets a connection establishment from the media gateway MGW1. Now the payload connection is set up from the incoming logical point Pi1 to the radio network controller RNC. In a next step 6 the radio network controller RNC sends an assignment response to the mobile services switching centre MSC.

The mobile services switching centre MSC starts a rerouting of the call. In this example because it receives an error message in a next step 7. This error message informs the mobile services switching centre MSC that the selected logical point Po1 has got a malfunction. The mobile services switching centre MSC requires and gets in a next step 8 from the media gateway a connection in the intermediate logical point Pv1 to a new resource. In next step 9 this resource Po12 is required, granted and through connected. The new payload connection is now through connected the outgoing logical point Po12. In a further step 10 the mobile services switching centre MSC sends a second assignment request to the radio network controller RNC. The radio network controller RNC recognises that there is already an assignment for this call. This is recognised either by a call identification that is sent with the assignment message or, as in GSM networks, by the SCCP (Signalling Connection Control Part) connection this assignment is sent through. If the second assignment requires different bearer capabilities than the first assignment, this is recognised because the second assignment has a different assignment type. Different bearer capabilities force the radio network controller RNC to release the existing connection to a user equipment and set up a new connection. The radio network controller RNC sends a second establish request and receives a second establish confirm in a next step 11. The radio network controller RNC replaces the current payload connection to the logical point Po1 of the media gateway MGW1 by the new payload connection to the logical point Po12 of the media gateway MGW2. In a next step 12 the radio network controller RNC sends a second assignment response to the mobile services switching centre MSC.

In the following the invention will be described by FIG. 4.

Figure 4:
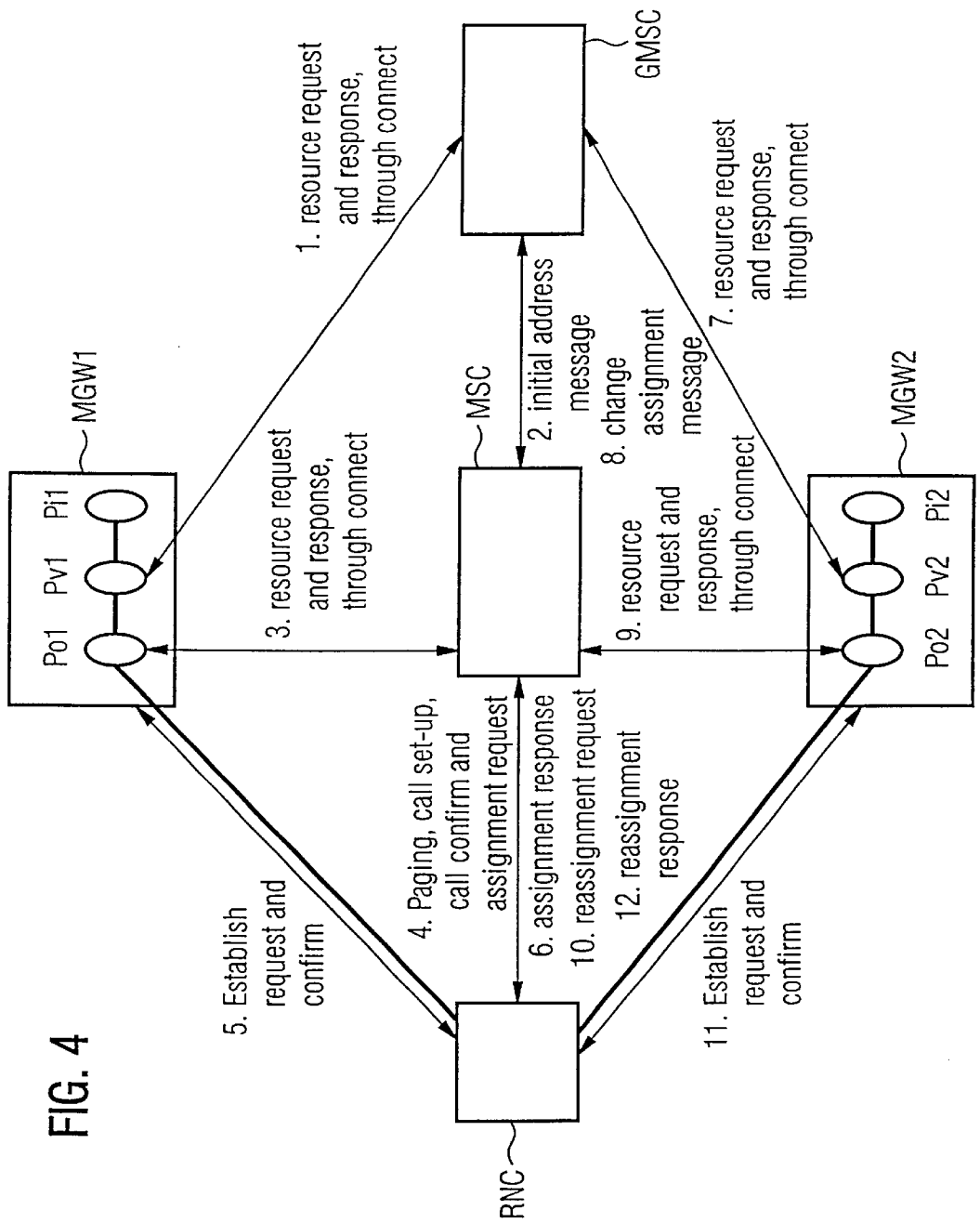
FIG. 4 depicts a reassignment of a radio network controller that is initiated by control node that does not serve the radio network controller.

FIG. 4 shows an extract of an UMTS communication network including a media gateway MGW1, a mobile services switching centre MSC, a gateway mobile services switching centre GMSC and a radio network controller RNC. The radio network controller RNC is in this case a terminating radio network controller RNC. As the network and the signalling in the network on both sides of the shown extract are not important for the invention the are not explained. A payload connection is already through connected to an incoming logical point Pi1 of the media gateway MGW1. The gateway mobile services switching centre GMSC is in charge of the call control after it received for example an initial address message. In a first step 1 the gateway mobile services switching centre GMSC requests, is granted resources for a payload connection from the media gateway MGW1. It also orders the through connection of the payload connection by these resources, a logical point Pv1. In a next step 2 it passes the call control to the mobile services switching centre MSC by sending an initial address message. The mobile services switching centre MSC requests and is granted resources from the media gateway MGW1 and orders the through connection of a payload connection to said resources Po1 in a next step 3. In a next step 4 the mobile services switching centre MSC orders the radio network controller RNC to do a paging. It receives a paging response sends a call set-up receives a call confirm and sends an assignment request. The radio network controller RNC sends an establish request to the media gateway MGW1 and receives an establish confirm in a next step 5. Then it returns an assignment response in a next step 6 to the mobile services switching centre MSC. The gateway mobile services switching centre GMSC initiates a change of the used payload transmission route. In a further step 7 it sends a resource request to a second media gateway MGW2. The second media gateway returns a resource response and is ordered to through connect. In a next step 8 the gateway mobile services switching centre GMSC informs the mobile services switching centre MSC that the current media gateway MGW1 is to be replaced by a second media gateway MGW2 by sending a change assignment message. This change assignment message contains at least a call identification and a media gateway address of the second media gateway MGW2 and is not part of the standards. This change assignment message is for example a second initial address message for an existing call. As sending a second initial address message is not allowed yet, this has to be implemented for the invention. The mobile services switching centre MSC can identify the change assignment message because an assignment for the identified call already exists. The mobile services switching centre MSC requires and is granted resources from the second media gateway in a next step 9. In this step it also orders the through connection of the payload connection through said resources. In this case from the logical point Pv2 to the logical point Po2. In a next step 10 the mobile services switching centre MSC sends a reassignment request to the radio network controller RNC. This reassignment can be a second assignment message for an existing call. The radio network controller RNC recognises that there is already an assignment for this call. This is recognised either by a call identification that is sent with the assignment message or, as in GSM networks, by the SCCP (Signalling Connection Control Part) connection this assignment is sent through. If the second assignment requires different bearer capabilities than the first assignment, this is recognised because the second assignment has a different assignment type. Different bearer capabilities force the radio network controller RNC to release the existing connection to a user equipment and set up a new connection. The radio network controller RNC sends an establish request to the second media gateway MGW2 and receives an establish conform in a next step 11. The radio network controller RNC replaces the current payload connection to the logical point Po1 of the media gateway MGW1 by the new payload connection to the logical point Po2 of the second media gateway MGW2. In a next step 12 the radio network controller RNC sends a second reassignment response to the mobile services switching centre MSC. The communication network with separated call control and bearer control contains means for implementing the methods, especially means for assigning of circuit identity codes or route or destination point codes and originating point codes to combinations of control nodes and payload transmission devices. The software is implemented in the payload transmission devices, the control nodes, and the radio access network controllers. It controls said devices by using the described methods.

What is claimed is:

1. A method for an interworking between a control node of a first communication network with separated call control and bearer control and a transit switch of a second network with monolithic signalling, the method comprising the steps of:

enabling the control node to control more than one payload transmission device for a payload interface;

identifying and handling, by the transit switch, each said control node and said payload transmission device as a single device; and identifying and handling, by said transit switch, each said control node and said payload transmission device as different devices.

2. The method according to claim 1, further comprising the step of sending a call attempt between said control node and said transit switch, said call attempt including an identification of said payload transmission device or said call attempt including an identification of a combination of said payload transmission device and said control node.

3. The method according to claim 1, wherein the step of sending said call attempt is made over at least one signalling connection.

4. The method according to claim 1 wherein the identification of a media gateway is made from at least one of a destination point code and an originating point code that is sent in an initial address message.

5. The method according to claim 1, wherein the identification of a media gateway is made by a circuit identity code sent in an initial address message.

6. The method according to claim 1, wherein the first network is a UMTS network with separated call control and bearer control.

7. The method according to claim 1, wherein the first network is a GSM network with separated call control and bearer control.

8. A communication system having a first network with separated call control and separated bearer control and second network with monolithic signalling, said first and second networks having communications therebetween, said system comprising:

at least one control node of said first network;

at least one transit switch of said second network;

a plurality of payload transmission devices, each connected to said at least one control node, said transit switch identifying, as a single device, a combination of said at least one control node and at least one of said plurality of payload transmission devices, said transit switch also identifying said at least one control node and at least one of said plurality of payload transmission devices separately as individual devices.

9. The method according to claim 1, wherein the steps are implemented by a software program.

* * * * *